A. E. CHURCH.
MACHINE CHUCK.
APPLICATION FILED OCT. 1, 1915.
1,219,439.
Patented Mar. 20, 1917.
3 SHEETS—SHEET 3.
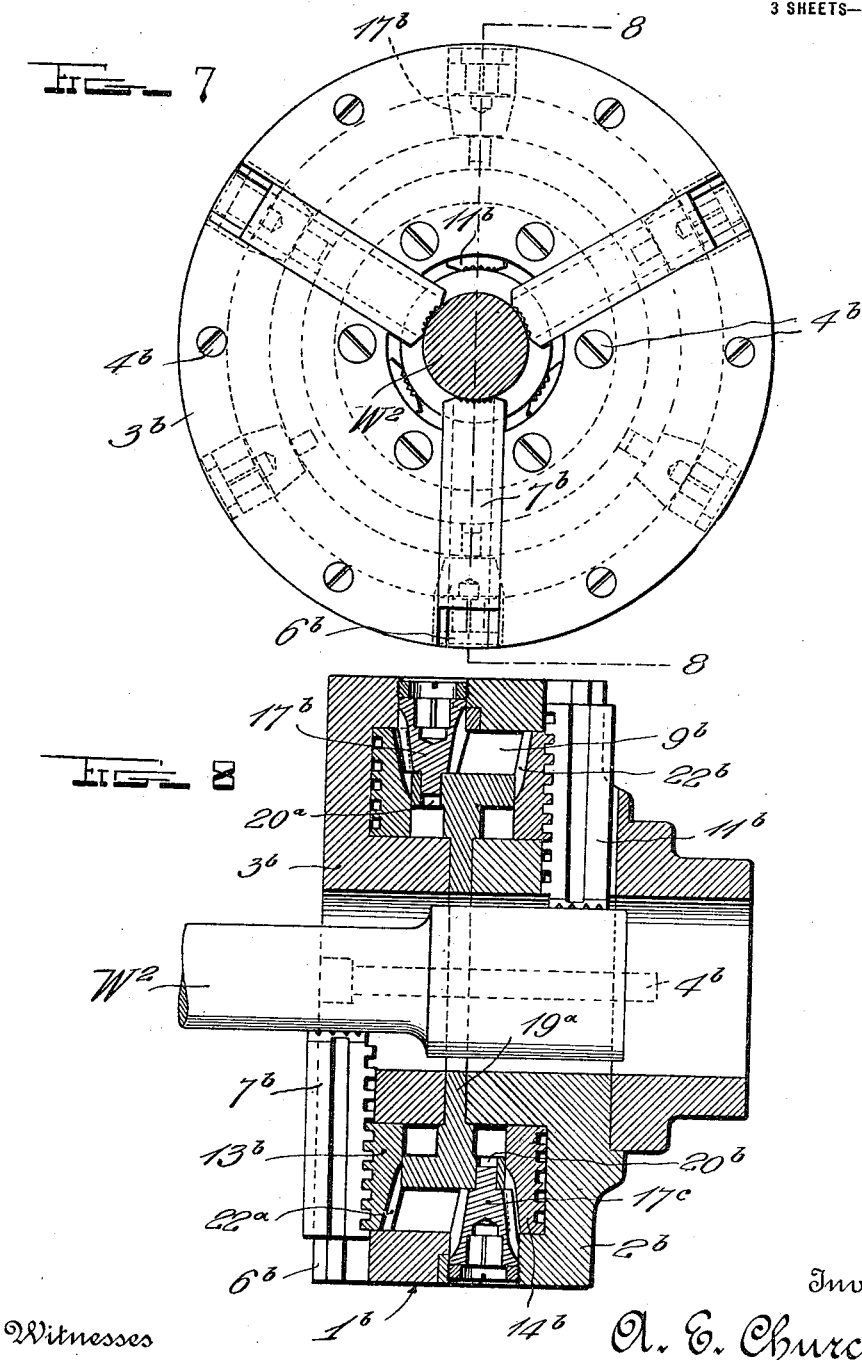

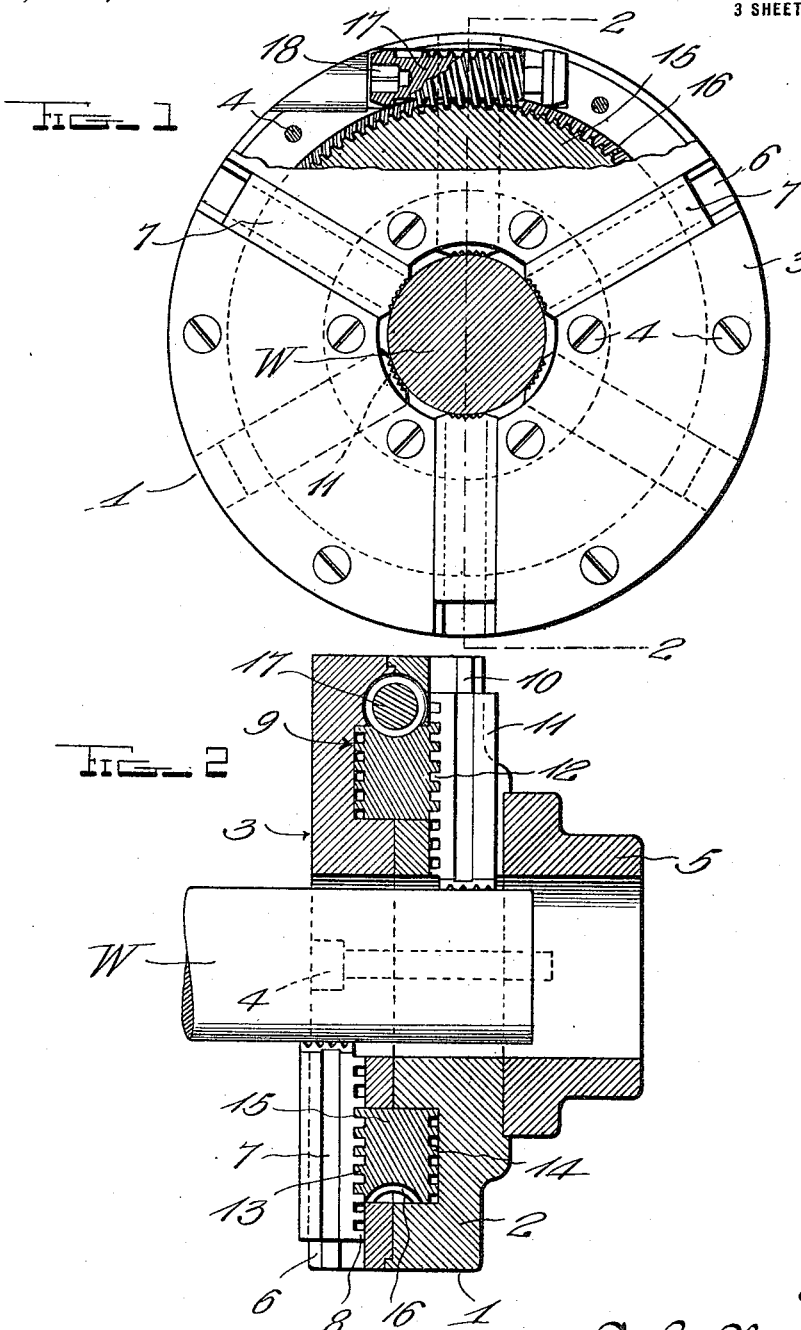

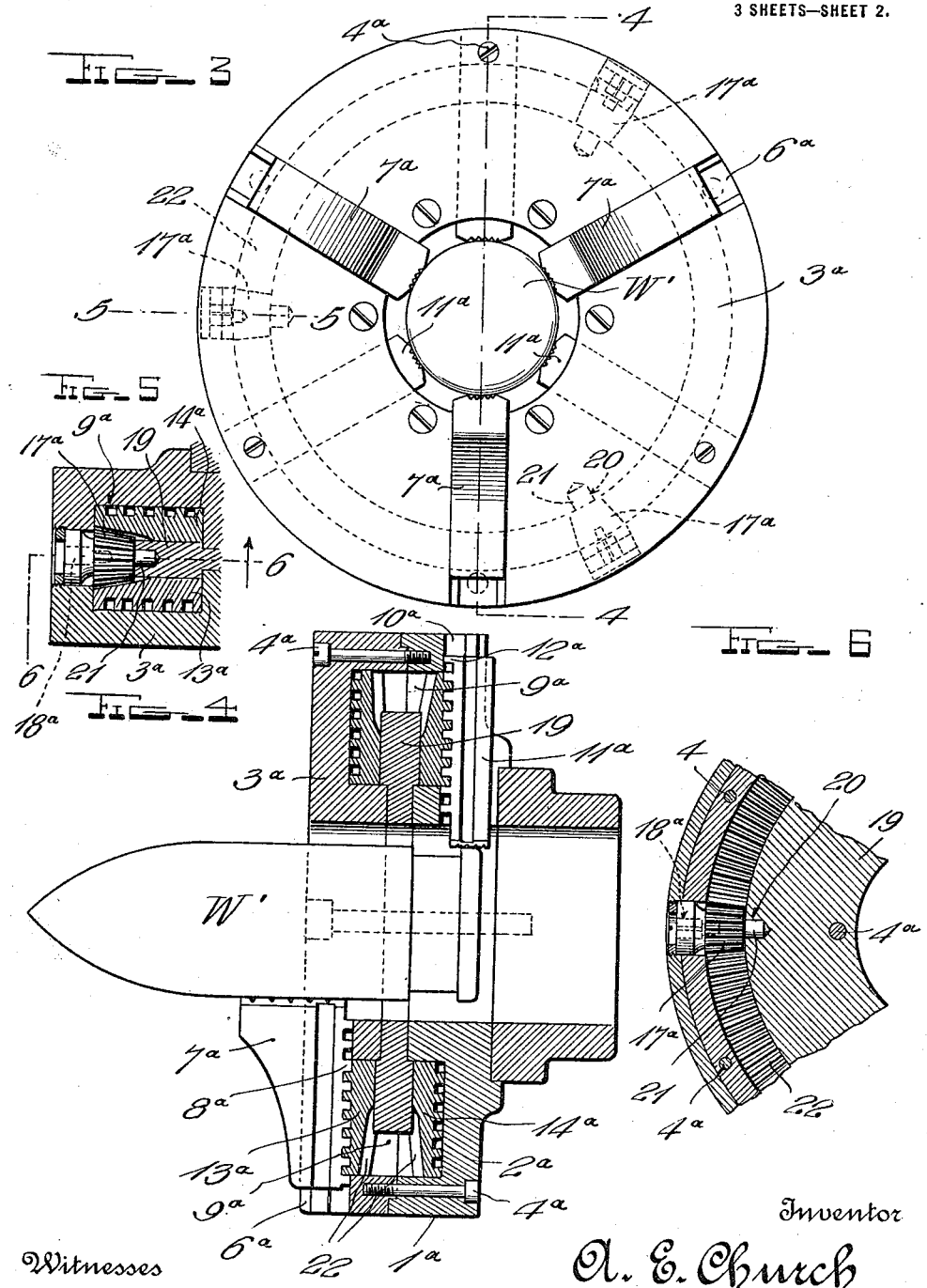

UNITED STATES PATENT OFFICE.

ALBERT E. CHURCH, OF NEW BRITAIN, CONNECTICUT, ASSIGNOR TO UNION MANUFACTURING COMPANY, OF NEW BRITAIN, CONNECTICUT, A CORPORATION OF CONNECTICUT.

MACHINE-CHUCK.

1,219,439.

Specification of Letters Patent.   Patented Mar. 20, 1917.

Application filed October 1, 1915.   Serial No. 53,528.

*To all whom it may concern:*

Be it known that I, ALBERT E. CHURCH, a citizen of the United States, residing at New Britain, in the county of Hartford and State of Connecticut, have invented certain new and useful Improvements in Machine-Chucks; and I do declare the following to be a full, clear, and exact description of the invention, such as will enable others skilled in the art to which it appertains to make and use the same.

My invention is an improved machine chuck designed primarily for the holding of elongated metal stock in lathes. Heretofore, numerous chucks have been employed for this purpose using one set of radially movable jaws, but it has been found that when lateral pressure is exerted on the work by the lathe tool, such work is often shifted obliquely of the chuck axis. This not only prevents the tool from operating properly, but exerts a prying action on the jaws and tends to cant the same in their guides, and in time, such continual prying bulges the face of the chuck head outwardly until the jaws are as apt to be disposed obliquely of the chuck axis, as they are to assume their proper right angular relation thereto. A chuck distorted in this manner (commonly called a bell mouth chuck among machinists) is practically worthless and in most cases is beyond repair.

It is therefore the object of my invention to supplement the usual work gripping jaws with a set of work bracing jaws spaced longitudinally therefrom. By so doing, canting of the work is prevented, thus allowing the lathe tool to more effectively operate, and all pressure on the gripping jaws is exerted in strictly radial directions only, thus producing no injurious effects whatever upon the chuck head. In addition to this main advantage, more effective gripping of the work is accomplished, and therefore possible turning thereof in the chuck is prevented.

In the attainment of the above specified end, I contemplate the use of certain novel features of construction and unique combinations of parts of which the accompanying drawings are illustrative, reference being made to the several figures by similar indices placed on corresponding parts through the several views.

In these drawings,

Figure 1 is a face view partly in section of one type of the invention;

Fig. 2 is a vertical longitudinal section thereof taken on the plane designated by the line 2—2 of Fig. 1;

Fig. 3 is a face view of an additional form of the chuck;

Fig. 4 is a vertical longitudinal section thereof taken on the plane of the line 4—4 of Fig. 3;

Fig. 5 is a detail section as viewed on the radial plane indicated by the line 5—5 of Fig. 3;

Fig. 6 is a detail transverse section on the plane of the line 6—6 of Fig. 5;

Fig. 7 is a face view of a third form of chuck; and

Fig. 8 is a longitudinal section thereof on the plane of the line 8—8.

In Figs. 1 and 2 of the drawings, the numeral 1 indicates broadly the cylindrical head of the chuck which is composed of a rear plate 2 and a face plate 3 secured together by machine screws or the like 4, the rear plate 2 being equipped with any preferred type of attaching neck 5 having a central bore which communicates with such bores in the two plates 2 and 3.

The face plate 3 is formed with a plurality of radially extending guideways 6 of common design in which a number of radially movable work gripping jaws 7 are slidably mounted, said jaws being provided on their inner sides with spirally directed teeth 8 presented toward an annular guideway 9 formed by grooving the abutting faces of the two plates concentrically with the axis of the chuck.

The rear plate 2 has formed therein a number of radially extending guideways 10 in which supplemental work bracing jaws 11 are mounted to slide, these jaws being equipped on their inner faces with spiral teeth 12 which, like the teeth 8, are presented toward the annular guideway 9.

The teeth 8 and 12 of the jaws 7 and 11 respectively, engage scrolls 13 and 14 formed on opposite sides of a ring 15 which is mounted rotatably in the guideway 9, the outer edge of said ring being channeled and formed with worm teeth 16 meshing with an operating worm 17, such worm being carried by the head 1 and being held in any preferred manner against axial movement. As is common with devices of this class, one end of the worm is provided with a socket 18 for the reception of the usual operating key.

By constructing the chuck in the manner described, the elongated metal stock or work W will be gripped at two longitudinally spaced points, and by so doing, such work is held against shifting obliquely of the chuck axis when pressure is brought to bear thereon by the tool of a lathe or the like on which the chuck is used. It will thus be seen that better results may be gained with the tool in question and that the work cannot exert a prying or canting action on the gripping jaws. These results are due entirely to the provision of the work bracing jaws 11. In addition to these main results, however, the jaws 11 afford greater gripping power and thus overcome any possibility of the work W turning within the chuck.

In most cases, the jaws 7 and 11 will be disposed in staggered relation in respect to each other, since it has been found that this disposition of parts operates more effectively, but obviously other relations between the two sets of jaws might well be used to advantage.

A different type of the invention is depicted in Figs. 3 to 6 inclusive, in which the chuck head $1^a$ is formed of a rear plate $2^a$ and a front plate $3^a$ secured together by screws or the like $4^a$, a bearing ring 19 being clamped between the central portions of the two plates. As is the case with the type of the invention previously described, the adjacent faces of the plates $2^a$ and $3^a$ are grooved concentric to the axis of the chuck to provide an annular guideway $9^a$. As shown clearly in Fig. 4, the outer edge portion of the bearing ring 19 projects into the aforesaid guideway $9^a$ and divides the same centrally.

The bearing ring 19 is formed in its outer edge with a number of circumferentially spaced bearing openings 20 receiving therein bearing studs 21 on the inner ends of jaw operating pinions $17^a$ which mesh with gear teeth 22 formed on the inner faces of a pair of scroll rings $13^a$ and $14^a$, the scrolls of these rings being formed on their outer faces. The scroll of the ring $13^a$ meshes with spiral teeth $8^a$ formed on radially slidable work gripping jaws $7^a$ which are mounted in guideways $6^a$ in the face plate $3^a$, while the scroll of the ring $14^a$ engages spirally directed teeth $12^a$ formed on the inner sides of supplemental work bracing jaws $11^a$, the latter being slidable radially in guideways $10^a$ formed in the rear plate $2^a$.

The outer ends of the pinions $17^a$ are formed with sockets $18^a$ designed to receive therein an appropriate key whereby said pinions may be rotated to so rotate the two scroll rings $13^a$ and $14^a$ as to shift their respective jaws simultaneously to grip the work W'.

The utility and advantages of the type of the invention just described are the same as those of that form depicted in Figs. 1 and 2, and in view of this, further exposition is deemed unnecessary.

A third type of the invention is depicted in Figs. 7 and 8. In these views, the chuck $1^b$ is formed of a rear plate $2^b$ and a face plate $3^b$, the two being secured together by screws or the like $4^b$ and having their adjacent faces grooved to form an annular guideway $9^b$ into which the outer edge of a bearing ring $19^a$ projects, said ring being clamped between the two plates $2^b$ and $3^b$ as shown, and having in its outer edge a number of radially disposed bearing openings $20^a$ disposed contiguous to the face plate $3^b$, and additional radially bearing openings $20^b$ positioned adjacent the plate $2^b$. It is within the openings $20^a$ and $20^b$ respectively that bearing studs on the inner ends of operating pinions $17^b$ and $17^c$, are rotatably mounted, said pinions having appropriate key receiving sockets in their outer ends as is the case with the pinions $17^a$.

The pinions $17^b$ mesh with gear teeth $22^a$ formed on the inner side of a scroll ring $13^b$, the scroll of such ring being engaged with teeth on the inner sides of radially slidable work gripping jaws $7^b$ carried in guideways $6^b$ formed in the face plate $3^b$, while the pinions $17^c$ engage gear teeth $22^b$ with which the inner side of a scroll ring $14^b$ is equipped, the scroll being formed on the outer side of said ring and engaging spiral teeth on the radially slidable work bracing jaws $11^b$.

The general utility of the construction shown in Figs. 7 and 8 is the same as that above pointed out, but in addition to the advantages derived by the forms of the invention previously described, the type in question possesses the additional advantage of allowing work to be gripped therein even though such work be of two or more diameters, such as indicated at $W^2$. This is allowed, since the two sets of jaws $7^b$ and $11^b$ are capable of operation independently.

From the foregoing description and explanation, when taken in connection with the accompanying drawings, the numerous improvements which I have made in the art to which the invention relates, will be readily understood by those skilled in such art, and it will be evident that I have provided a chuck which overcomes difficulties which have long baffled expert machinists, thus fulfilling a long felt need.

In the drawings, certain specific details of construction have been shown for illustrative purposes, and in the preceding such details have been described, but obviously numerous changes may be made within the scope of the invention without sacrificing any of the advantages thereof.

I claim:—

A chuck comprising a cylindrical body having therein an axial work receiving bore and having at its front and rear sides a plurality of radially disposed guideways, and a front and a rear set of work gripping jaws slidable in said guideways, the rear guideways being disposed opposite the spaces between the front guideways to prevent excessive weakening of the chuck body and to locate the jaws of one set in staggered relation with those of the other.

In testimony whereof I have hereunto set my hand in presence of two subscribing witnesses.

ALBERT E. CHURCH.

Witnesses:
 CARL S. MUELLER,
 H. E. MYERS.

Copies of this patent may be obtained for five cents each, by addressing the "Commissioner of Patents, Washington, D. C."